Figure 1:
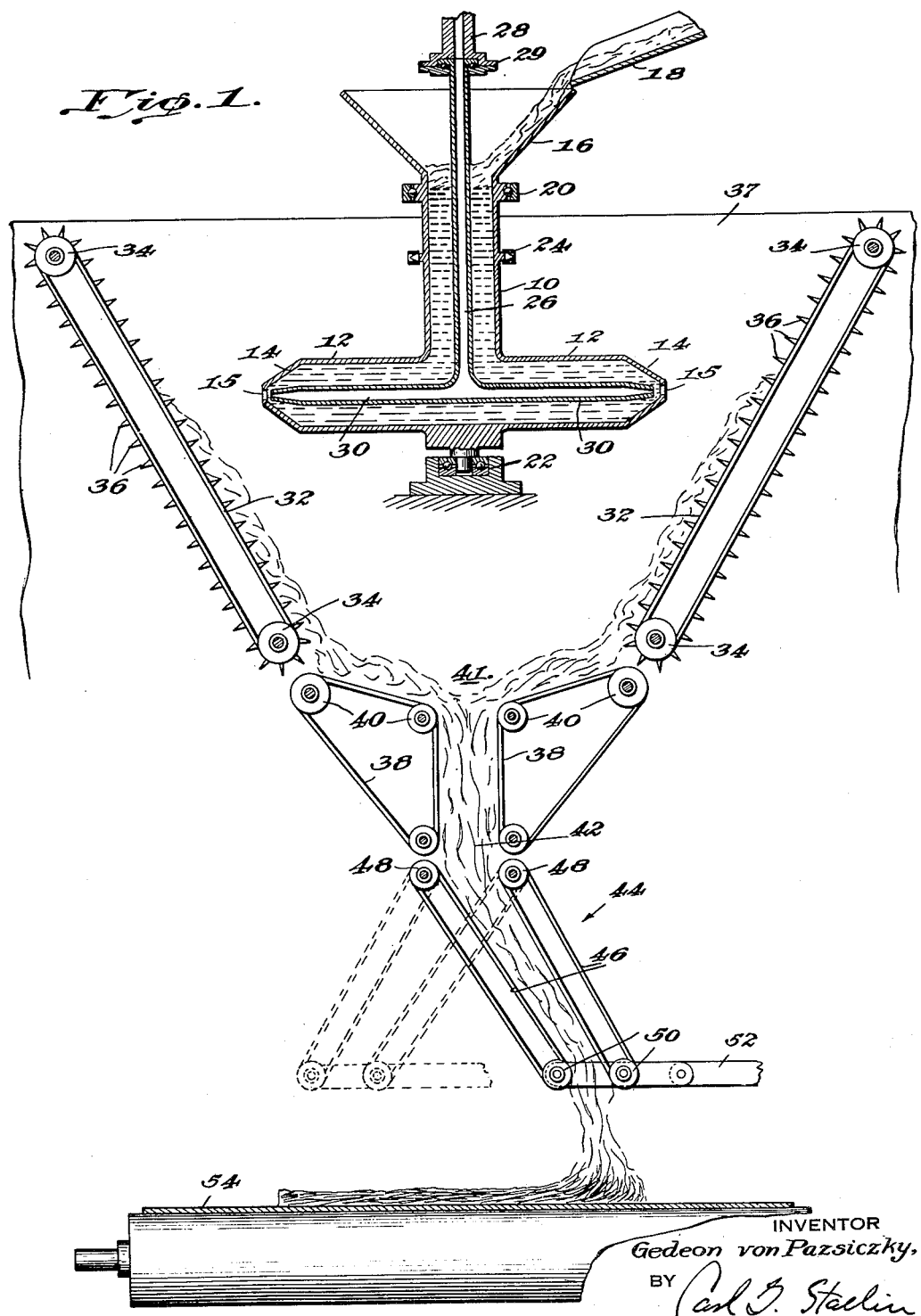

Nov. 2, 1943.   G. VON PAZSICZKY   2,333,218
METHOD OF AND APPARATUS FOR PRODUCING GLASS FIBERS
Filed Nov. 6, 1939   2 Sheets-Sheet 1

INVENTOR
Gedeon von Pazsiczky,
BY
ATTORNEY

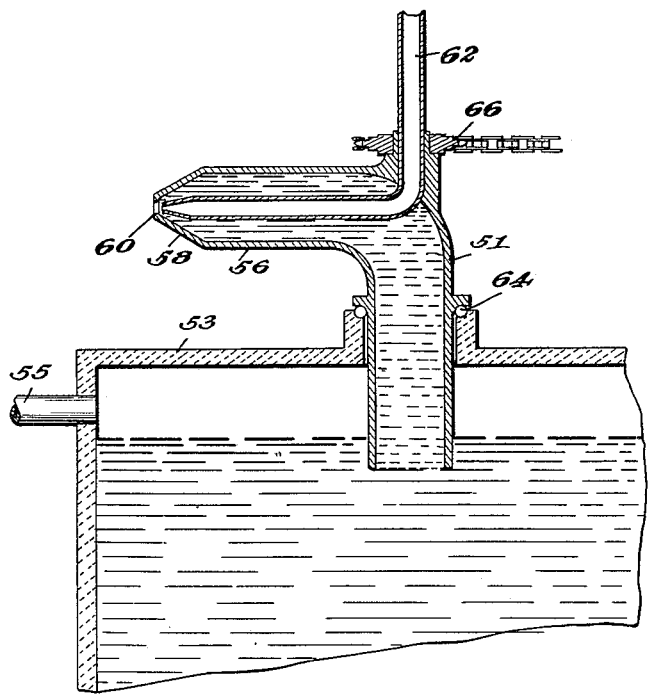

Patented Nov. 2, 1943

2,333,218

UNITED STATES PATENT OFFICE 2,333,218

METHOD OF AND APPARATUS FOR PRODUCING GLASS FIBERS

Gedeon von Pazsiczky, Hamburg-Wandsbek, Germany; vested in the Alien Property Custodian Application November 6, 1939, Serial No. 303,057
In Germany November 10, 1938

7 Claims. (Cl. 83—91)

The present invention relates to a method of and apparatus for producing relatively fine fibers or filaments from molten glass, slag and other inorganic materials which are plastic when heated.

The principal object of the invention is to provide such a method and apparatus wherein creation and attenuation of the fibers is accomplished by spraying molten glass from a nozzle, the spraying effect by means of which the fibers are formed and attenuated being augmented by the action of centrifugal force.

In carrying out this object the invention contemplates the provision of a laterally directed angularly moving nozzle from which the molten glass is continuously ejected by means of a blast of air, steam, or other gaseous medium, the fibers being formed and attenuated by the ejecting medium and being further attenuated by the action of centrifugal force created by rotation of the nozzle.

It is another object of the invention to provide a novel fiber receiving and depositing apparatus by means of which the fibers produced by the forming and attenuating apparatus are collected, brought to a common region, and are distributed over the surface of a conveyor in mat form.

Other objects of the invention, not at this time enumerated, will become apparent as the nature of the invention is better understood.

In the accompanying two sheets of drawings two embodiments of the invention are shown and in these drawings:

Fig. 1 is a vertical, longitudinal sectional view, digrammatic in its representation, of a fiber forming and collecting apparatus constructed in accordance with the principles of the present invention; and Fig. 2 is a vertical, longitudinal sectional view of a modified form of fiber forming apparatus.

Referring now to Fig. 1, a receptacle in the form of a vertical tube or casing 10 is formed with a plurality of laterally extending horizontal portions 12 terminating in nozzles 14 having spray openings 15 formed at the outer ends thereof. The upper end of the casing 10 is widened as at 16 to provide a funnel portion by means of which molten glass may be supplied to the casing by means of a chute 18. The casing 10, 12, is mounted in upper and lower bearings 20 and 22 respectively and is designed for rotation about a vertical axis. A chain and sprocket mechanism 24 is utilized for effecting rotation of the casing 12 together with its associated parts.

A tube 26 leading from an air or other gas supply conduit 28, to which it is connected by means of a slip-joint 29, extends through the casing 10 and is formed with lateral branch portions 30 which extend into the horizontal portions 12 of the casing 10 and terminate adjacent the spray openings 15.

Molten glass supplied to the casing 10 by means of the chute 18 fills the interior of the same and is ejected from the spray openings 15 by means of the blasts of air issuing from the branch portions 30 of the tube 26. The air introduced to the nozzles 14 through the tube 26 and its branch portions 30 is preferably superheated to a temperature of not less than 450° C. and thus the glass which is brought to the nozzles 14 is maintained in a highly liquid state. As a consequence, a series of relatively fine fibers or filaments are formed in the vicinity of the openings 15 and are attenuated and made still finer by the action of the blasts of air issuing from the ends of the branch portions of the tube 26. Attenuation of the fibers is still further augmented by the centrifugal forces acting upon the fibers by virtue of the fact that the casing 10 is rotated about a central axis at relatively high speed.

In order to collect and distribute the fibers that are ejected radially outwardly from the nozzles 14, a pair of endless conveying belts 32 mounted on sprocket wheels 34 are disposed on opposite sides of the fiber forming apparatus and extend from points above the level of the nozzles 14 downwardly and inwardly toward each other and terminate below the level of the nozzles. A pair of confining walls, one of which is shown at 37, are situated on opposite sides of the conveyor belts 32 and bridge the distance therebetween. A series of spurs or the like 36 are formed on the conveyor belts 32 to maintain an even distribution of the fibers issuing from the nozzles 14 on the belts.

A pair of conveyor belts 38 mounted on rollers 40 are disposed beneath the conveyor belts 32 and are adapted to receive thereon the fibers discharged from the latter and convey the same to a common region 41 from whence they are carried downwardly as at 42 between the two belts 38 are received in a fiber distributing device designated generally at 44. The distributing device 44 consists of a pair of parallel extending endless belts 46 suspended from a pair of driving rollers 48 and capable of swinging movement to and fro (as shown by the dotted and full lines) by means of a pair of rollers 50 carried by an actuating bar 52.

The fibrous material issuing from the distributing device 44 is deposited on a conveyor belt 54 the upper surface of which moves transversely to the direction of swinging movement of the distributing belts 46. The fibrous material is thus placed on this latter conveyor belt 54 in a zig-zag manner and the same may subsequently be stitched or drafted as desired.

While for illustrative purposes two conveyor belts 32 are shown in the drawings, it is within the scope of the present invention to dispense with the confining walls 37 and utilize additional conveyor belts 32 in their stead. Any number of such conveyor belts may be spaced around the centrifuging apparatus.

In Fig. 2 a modified form of centrifugal fiber forming and attenuating apparatus is shown. In this form of the invention a vertical riser 51 in the form of a tube or casing extends downwardly below the surface of a body of molten glass contained in a tank 53. The glass is forced upwardly in the riser 51 by means of air pressure which is built up in the tank by means of compressed air issuing from a conduit 55. The riser 51 is formed with a horizontal portion 56 providing a nozzle 58 similar to the nozzle 14 and having an opening 60 in the end thereof. Superheated air or other gaseous medium is conducted to the nozzle through a tube 62 which passes through the casing 51 and terminates in the vicinity of the opening 60. The casing 51 is mounted for rotation about a vertical axis in bearings 64 and is driven or rotated by a chain and sprocket mechanism 66.

In this form of the invention the principle of fiber formation and attenuation is substantially the same as in the preceding form of the invention previously described. However, if desired, the combined attenuating effect of the blast of air issuing from the tube 62 and of centrifugal force as obtained by rotation of the riser 51 and its associated parts may be still further augmented by maintaining an excess pressure within the tank 53. The glass issuing from the nozzle 58 will thus be given additional impetus and consequently the character of the fibers or filaments produced will be correspondingly finer.

The invention is not to be limited to the exact arrangement of parts shown in the accompanying drawings or described in this specification as various changes in the details of construction may be resorted to without departing from the spirit of the invention. For example, while in Fig. 1 there is disclosed a pair of oppositely directed nozzles 14, a single nozzle or a greater number of such nozzles may be employed. Likewise in Fig. 2 wherein a single nozzle 58 is shown it is to be understood that a plurality of such nozzles may well be utilized. Modifications may be resorted to, and only insofar as the invention has particularly been pointed out in the accompanying claims is the same to be limited.

I claim:

1. The method of producing glass fibers from a body of molten glass contained within a receptacle having a laterally directed opening therein which comprises maintaining the molten glass within the receptacle and adjacent the opening under pressure, releasing a superheated gaseous medium within the body of molten glass and interiorly of the receptacle in the vicinity of the opening and directing the same through the opening outwardly of the receptacle to accelerate and attenuate the glass into fibers while simultaneously rotating the receptacle about a vertical axis to augment such attenuation of the fibers by the action of centrifugal force.

2. The method of producing glass fibers from a body of molten glass contained within a receptacle having an opening therein below the level of molten glass in the receptacle, which comprises releasing a superheated gaseous medium within the receptacle adjacent the opening and within the body of molten glass, and directing the gaseous medium outwardly through the opening of the receptacle to eject the molten glass and accelerate and attenuate the glass into fibers while simultaneously rotating the receptacle about an axis spaced from said opening and normal to the direction of flow of glass therethrough to augment attenuation of the fibers by the action of centrifugal force.

3. Apparatus for producing fibrous glass comprising a receptacle for molten glass and having a laterally directed nozzle ending in a spray opening beneath the level of glass in the receptacle, means for rotating said receptacle above a vertical axis, means for supplying molten glass to the receptacle and thereby building up a liquid pressure within the nozzle adjacent the spray opening, and means for supplying compressed air to the nozzle including a blower to accelerate and attenuate the glass into fibers through the spray opening.

4. Apparatus for producing fibrous glass comprising a closed tank adapted to contain a supply body of molten glass, a hollow centrifuging member having a generally tubular portion extending vertically through the top of the tank and terminating at its lower end in an opening disposed below the level of glass in the supply body, said centrifuging member including at the outside of the tank a nozzle communicating with said tubular portion and having a laterally extending spray opening, means for rotating the centrifuging member about the vertical axis of said tubular portion, means for supplying air under pressure to the tank to force the molten glass therein upwardly into the centrifuging member, and means for supplying a gaseous medium under pressure to the nozzle and through the opening therein to accelerate the glass and aid in attenuating the same into fibers.

5. Apparatus for producing fibrous glass comprising a receptacle having a horizontally directed nozzle ending in a spray opening, means for rotating said receptacle about a vertical axis that is spaced from said opening, means for supplying molten glass to the nozzle, and means for supplying compressed air to the nozzle having a blast-emitting opening within the body of glass and adjacent the spray opening to accelerate and attenuate the glass into fibers through said spray opening.

6. The method of producing glass fibers which comprises spraying molten glass by means of a gaseous blast from a laterally directed nozzle to accelerate and attenuate the glass into fibers while simultaneously rotating the nozzle about an axis that is spaced from the nozzle opening and normal to the nozzle to augment such attenuation of the fibers by the action of centrifugal force.

7. Apparatus for producing fibrous glass comprising a receptacle having a laterally directed nozzle ending in a spray opening, means for rotating said receptacle about an axis that is spaced from said opening and normal to the nozzle, means for supplying molten glass to the receptacle, and means for supplying compressed air to the nozzle having a blast-emitting opening within the body of glass and adjacent the spray opening to accelerate and attenuate the glass into fibers through said spray opening.

GEDEON von PAZSICZKY.

CERTIFICATE OF CORRECTION.

Patent No. 2,333,218.  November 2, 1943.

GEDEON von PAZSICZKY.

It is hereby certified that error appears in the printed specification of the above numbered patent requiring correction as follows: Page 2, second column, line 14, claim 3, for "above" read --about--; and that the said Letters Patent should be read with this correction therein that the same may conform to the record of the case in the Patent Office.

Signed and sealed this 18th day of December, A. D. 1945.

Leslie Frazer (Seal)  First Assistant Commissioner of Patents.